(12) United States Patent
Holdren et al.

(10) Patent No.: US 9,286,030 B2
(45) Date of Patent: Mar. 15, 2016

(54) METHODS AND APPARATUS FOR PROCESSING MULTIPLE AUDIO STREAMS AT A VEHICLE ONBOARD COMPUTER SYSTEM

(71) Applicant: GM GLOBAL TECHNOLOGY OPERATIONS LLC, Detroit, MI (US)

(72) Inventors: John L. Holdren, Ferndale, MI (US); Xufang Zhao, Warren, MI (US); Gaurav Talwar, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 224 days.

(21) Appl. No.: 14/058,060

(22) Filed: Oct. 18, 2013

(65) Prior Publication Data

US 2015/0110287 A1    Apr. 23, 2015

(51) Int. Cl.
| | |
|---|---|
| *H04B 1/00* | (2006.01) |
| *G06F 3/16* | (2006.01) |
| *B60R 11/02* | (2006.01) |
| *G10L 15/22* | (2006.01) |
| *H04R 1/02* | (2006.01) |

(52) U.S. Cl.
CPC ............ *G06F 3/167* (2013.01); *B60R 11/0247* (2013.01); *G06F 3/165* (2013.01); *G10L 15/22* (2013.01); *H04R 1/02* (2013.01); *G10L 2015/223* (2013.01); *H04R 2410/00* (2013.01); *H04R 2499/13* (2013.01)

(58) Field of Classification Search
None
See application file for complete search history.

(56) References Cited

U.S. PATENT DOCUMENTS

| 7,016,836 | B1* | 3/2006 | Yoda .............................. 704/233 |
|---|---|---|---|
| 7,415,116 | B1* | 8/2008 | Fels ................................ 381/86 |
| 8,738,368 | B2* | 5/2014 | Gratke et al. ................... 381/92 |
| 2007/0053524 | A1* | 3/2007 | Haulick et al. .................. 381/92 |
| 2007/0218959 | A1* | 9/2007 | Kim .......................... 455/569.2 |
| 2007/0280486 | A1* | 12/2007 | Buck et al. ....................... 381/92 |
| 2010/0215190 | A1* | 8/2010 | Itou ................... G10K 11/1786 381/94.2 |
| 2011/0112674 | A1* | 5/2011 | Huijnen .............. G10L 21/0364 700/94 |
| 2011/0216913 | A1* | 9/2011 | Bonne ............................. 381/77 |
| 2013/0179163 | A1* | 7/2013 | Herbig et al. ................... 381/86 |
| 2014/0074480 | A1* | 3/2014 | Gratke et al. ................. 704/275 |

* cited by examiner

*Primary Examiner* — Thang Tran
(74) *Attorney, Agent, or Firm* — Ingrassia Fisher & Lorenz, P.C.

(57) ABSTRACT

A method for processing a plurality of audio streams at a computer system onboard a vehicle is provided. The method receives the plurality of audio streams from a plurality of locations within a vehicle; prioritizes each of the plurality of audio streams to obtain a prioritization result; and completes a task associated with each of the plurality of audio streams, according to the prioritization result.

19 Claims, 3 Drawing Sheets

FIG. 4

METHODS AND APPARATUS FOR PROCESSING MULTIPLE AUDIO STREAMS AT A VEHICLE ONBOARD COMPUTER SYSTEM

TECHNICAL FIELD

Embodiments of the subject matter described herein relate generally to audio processing. More particularly, embodiments of the subject matter relate to processing multiple audio streams received at a computer system onboard a vehicle.

BACKGROUND

Many vehicles have onboard computer systems offering functional, informational, and/or entertainment capabilities. Such onboard computer systems may include a speech recognition feature, configured to recognize voice commands from a user so that task commands may be executed without requiring a user to direct his attention toward the computer system. A user can verbally articulate a command, and the vehicle onboard computer system completes a task corresponding to the received command. Such commands may include functionality relating to hands-free calling (Bluetooth), GPS navigation, radio tuning/volume adjustment, internet applications, and various media/entertainment capabilities.

Conventional methods use one or more microphones positioned near the driver seat of a vehicle, under the assumption that all commands will come from the driver and, consequently, all voice commands will come from the driver. However, as the capabilities of the vehicle onboard computer system expand, commands may include tasks that other passengers, besides the driver, wish to initiate. For example, a passenger sitting in the backseat of a vehicle may wish to utilize the media/entertainment or internet capabilities of the system, such as playing a DVD or accessing a software application. In this case, the passenger would not have the ability to initiate such tasks using voice recognition, because there are no microphones for receiving passenger voice data. In addition, the microphone(s) positioned near the driver generally execute audio filtering algorithms for the purpose of recognizing voice data coming from the driver and filtering (e.g., discarding) all other audio data.

Accordingly, it is desirable to provide vehicle passengers the ability to submit voice commands to a vehicle onboard computer system for execution. Furthermore, other desirable features and characteristics will become apparent from the subsequent detailed description and the appended claims, taken in conjunction with the accompanying drawings and the foregoing technical field and background.

BRIEF SUMMARY

A method for processing a plurality of audio streams at a computer system onboard a vehicle is provided. The method receives the plurality of audio streams from a plurality of locations within a vehicle; prioritizes each of the plurality of audio streams to obtain a prioritization result; and completes a task associated with each of the plurality of audio streams, according to the prioritization result.

An audio processing system for processing a plurality of audio streams simultaneously received at a vehicle onboard computer system is provided. The audio processing system includes an audio detection module, configured to receive and differentiate between a plurality of audio streams in a vehicle, each of the plurality of audio streams comprising a task to be performed by the vehicle onboard computer system; a prioritization module, configured to determine a processing sequence for a plurality of tasks associated with received audio streams; and a processing module, configured to process and perform the plurality of tasks according to the processing sequence.

A non-transitory, computer-readable storage medium comprising instructions stored thereon, wherein the instructions, when executed by a processor, perform a method is provided. In response to received audio data at a vehicle onboard computer system, the method extracts a plurality of audio streams from the received audio data; and determines a precedence for processing each of the plurality of audio streams at the vehicle onboard computer system.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to methods an apparatus used to process multiple audio streams that are received simultaneously at a vehicle onboard computer system. Generally, the system receives two or more streams of audio data at the same time, and in some embodiments, from different locations in the vehicle. The system identifies a task associated with each audio stream, and sets a priority for each task. The system then processes each task according to its priority.

Figure 1:
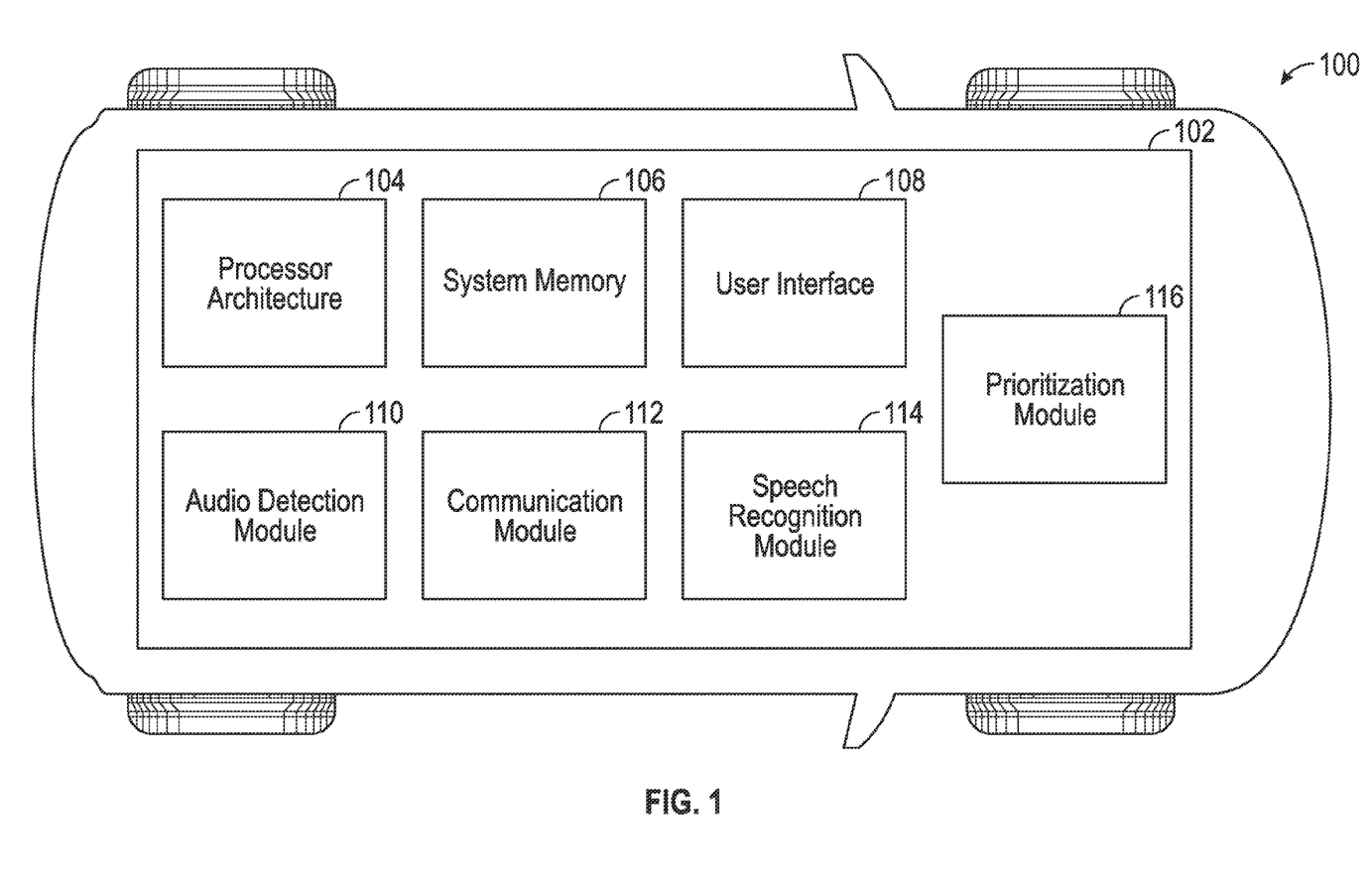
FIG. 1 is a functional block diagram of a vehicle that includes an onboard computer system, according to some embodiments.

Referring now to the drawings, FIG. 1 is a functional block diagram of a vehicle 100 that includes an onboard computer system 102, according to some embodiments. The onboard computer system 102 may be implemented using any number (including only one) of electronic control modules onboard the vehicle 100. The vehicle 100 may be any one of a number of different types of types of automobiles (sedans, wagons, trucks, motorcycles, sport-utility vehicles, vans, etc.), aviation vehicles (such as airplanes, helicopters, etc.), watercraft (boats, ships, jet skis, etc.), trains, all-terrain vehicles (snowmobiles, four-wheelers, etc.), military vehicles (Humvees, tanks, trucks, etc.), rescue vehicles (fire engines, ladder trucks, police cars, emergency medical services trucks and ambulances, etc.), spacecraft, hovercraft, and the like.

The onboard computer system 102 is configured to receive and process audio streams, including multiple audio streams that are received simultaneously. The onboard computer system 102 may include, without limitation: a processor architecture 104, a system memory 106, a user interface 108, an audio detection module 110, a communication module 112, a speech recognition module 114, and a prioritization module 116. These elements and features of an onboard computer system 102 may be operatively associated with one another, coupled to one another, or otherwise configured to cooperate with one another as needed to support the desired functionality—in particular, receiving and processing multiple audio streams simultaneously, as described herein. For ease of illustration and clarity, the various physical, electrical, and logical couplings and interconnections for these elements and features are not depicted in FIG. 1. Moreover, it should be appreciated that embodiments of the onboard computer system 102 will include other elements, modules, and features that cooperate to support the desired functionality. For simplicity, FIG. 1 only depicts certain elements that relate to the techniques for processing multiple audio streams, as described in more detail below.

The processor architecture 104 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the processor architecture 104 may be realized as one or more microprocessors, controllers, microcontrollers, or state machines. Moreover, the processor architecture 104 may be implemented as a combination of computing devices, e.g., a combination of digital signal processors and microprocessors, a plurality of microprocessors, one or more microprocessors in conjunction with a digital signal processor core, or any other such configuration.

The system memory 106 may be realized using any number of devices, components, or modules, as appropriate to the embodiment. Moreover, the vehicle onboard computer system 102 could include system memory 106 integrated therein and/or system memory 106 operatively coupled thereto, as appropriate to the particular embodiment. In practice, the system memory 106 could be realized as RAM memory, flash memory, EPROM memory, EEPROM memory, registers, a hard disk, a removable disk, or any other form of storage medium known in the art. In certain embodiments, the system memory 106 includes a hard disk, which may also be used to support functions of the onboard computer system 102. The system memory 106 can be coupled to the processor architecture 104 such that the processor architecture 104 can read information from, and write information to, the system memory 106. In the alternative, the system memory 106 may be integral to the processor architecture 104. As an example, the processor architecture 104 and the system memory 106 may reside in a suitably designed application-specific integrated circuit (ASIC).

The user interface 108 may include or cooperate with various features to allow a user to interact with the onboard computer system 102. Accordingly, the user interface 108 may include various human-to-machine interfaces, e.g., a keypad, keys, a keyboard, buttons, switches, knobs, a touchpad, a joystick, a pointing device, a virtual writing tablet, a touch screen, a plurality of microphones, or any device, component, or function that enables the user to select options, input information, or otherwise control the operation of the onboard computer system 102. For example, the user interface 108 could be manipulated by an operator to manually select from a presented list of command options for an onboard computer system 102, as described below.

The audio detection module 110 is suitably configured to utilize a plurality of audio input ports, such as microphones, at a plurality of locations in a vehicle 100 to detect and receive audio data. One or more audio input ports are positioned at a driver seat, a front row passenger seat, various positions in a second row of vehicle seats, various positions in a potential third row of vehicle seats, etc. Positioning of the plurality of audio input ports will depend upon the size of the vehicle 100, which affects the number of vehicle seats and/or rows of vehicle seats located inside the vehicle 100. In certain embodiments, audio input ports are positioned to receive audio data at individual vehicle seats, and in some embodiments, audio input ports are positioned to receive audio data for an entire row of vehicle seats. In exemplary embodiments, a combination of the two schemes is used for audio input port placement inside the vehicle 100.

Each audio input port (or group of audio input ports) is configured to receive audio signals that are audible within the range or zone of one location, and to transmit the audio signals from one location to a designated audio stream buffer that is assigned to that particular audio input port. Each location, whether using one or more than one audio input port, transmits audio signals to one audio stream buffer that is used for that particular location. For example, audio data received at an audio input port (or ports) positioned at a driver seat transmits Driver Seat Audio Data to the Driver Seat Audio Data Buffer. The Driver Seat Audio Data Buffer receives Driver Seat Audio Data only. Thus, the system receives an individual audio stream for processing from each location in the vehicle 100, and each location is associated with an audio stream buffer that is dedicated to that particular location.

Further, each audio input port may be tuned to receive audio signals at a defined range of frequencies based upon its location. For example, audio input ports positioned at a second or third row may be tuned to receive higher frequencies, because children are more likely to be seated in the second or third rows and children's voices tend to be on the higher end of the frequency spectrum. Specifically, a front seat audio input port may be configured to receive frequencies up to 7 kHz, while the back seat audio input port may be configured to receive frequencies up to 8 kHz. In some embodiments, each audio input port may be tuned by a driver or passenger of the vehicle 100 via a user interface 108 of the vehicle onboard computer system 102.

Each audio input port, when tuned to receive audio signals within a defined range of frequencies, technically receives all input signals, but internal audio processing algorithms may be programmed to filter all audio outside of the applicable range of frequencies. Using the previous example of audio input ports positioned at a second row that are tuned to receive the higher frequencies associated with children's voices, an adult male voice would likely fall outside of the applicable frequency range and would be filtered out of the audio stream for the second row. This filtering occurs as a function of internal software algorithms.

The communication module 112 is suitably configured to communicate data between the onboard computer system 102 and one or more remote servers. In certain embodiments, the communication module 112 is implemented as an onboard vehicle communication or telematics system, such as an OnStar® module commercially marketed and sold by the OnStar® corporation, which is a subsidiary of the assignee of the instant Application, the General Motors Company, currently headquartered in Detroit, Mich. In embodiments wherein the communication module 112 is an OnStar® module, an internal transceiver may be capable of providing bi-directional mobile phone voice and data communication, implemented as Code Division Multiple Access (CDMA). In some embodiments, other 3G technologies may be used to implement the communication module 112, including without limitation: Universal Mobile Telecommunications System (UMTS) wideband CDMA (W-CDMA), Enhanced Data Rates for GSM Evolution (EDGE), Evolved EDGE, High Speed Packet Access (HSPA), CDMA2000, and the like. In some embodiments, 4G technologies may be used to implement the communication module 112, alone or in combination with 3G technologies, including without limitation: Evolved High Speed Packet Access (HSPA+), Long Term Evolution (LTE) and/or Long Term Evolution-Advanced (LTE-A). As described in more detail below, data transmitted to a remote server by the communication module 112 may include, without limitation: received audio data (in the form of individual audio streams or otherwise), requests to process received audio data, and the like. Data received by the communication module 112 may include, without limitation: extracted voice data, identified task commands, a priority order for processing applicable task commands, and other relevant data compatible with the onboard computer system 102.

The speech recognition module 114 is configured to analyze each received audio stream to determine the voice data contained within each audio stream. Each audio stream includes voice data, which may be translated into one or more articulated task commands used to initiate functionality of the vehicle onboard computer system 102. For example, a user task associated with a function of the vehicle onboard computer system 102 is executed by a statement, or task command, which is spoken aloud by a user. The audio data, including the articulated task command and any background noise, is received by one or more audio input ports that are positioned near the user. Each audio input port filters the extraneous audio data (e.g., the background noise) to identify and retrieve the applicable voice data.

Once the voice data has been identified, an automated speech recognition (ASR) algorithm identifies the words within the voice data to determine the applicable task to be completed by the vehicle onboard computer system 102. Voice commands may initiate any number of defined tasks within the vehicle onboard computer system 102. Specific tasks to be completed by the vehicle onboard computer system 102 may be designated as "more likely" to be executed by a specific vehicle seat and/or row of vehicle seats, based on any number of factors, which may include: previous command history, most-likely occupants of the location in question, limited number of onboard computer system capabilities available in the location in question, and the like.

The applicable task determined by the ASR algorithm may include a plurality of hypotheses, and each hypothesis may be ranked in terms of statistical likelihood that the particular hypothesis is the correct one. For example, if the driver of a vehicle verbally requests streaming music from Artist A, the ASR algorithm identifies the words spoken by the driver and presents selectable options to the driver, which may include Artist A, Artist B, and Artist C. All hypotheses presented to the driver, in this case, have similar sounding names and are possibilities for interpretation of the applicable audio stream. In certain embodiments, only hypotheses having a statistical likelihood above a predefined threshold are presented to the driver, and in other embodiments, a predefined number of options are presented to the driver regardless of statistical likelihood. Additionally, hypotheses may be presented to the driver as a list of user-selectable options on a visual display, or hypotheses may be presented to the driver audibly.

The audio detection module 110 and the speech recognition module 114 are further configured to receive and analyze the plurality of audio streams in parallel. Conventional systems generally receive and process audio data in a front-row location only (e.g., the driver seat), requiring the processing of only one audio stream at a time. However, in the system described herein, the audio detection module 110 is capable of receiving audio data from multiple locations in the vehicle 100 simultaneously, and the speech recognition module 114 is configured to simultaneously analyze and identify the user-articulated task commands associated with each audio stream. In a vehicle 100 possessing this capability of processing multiple audio streams simultaneously, passengers seated at various locations in the vehicle 100 may utilize voice commands to execute tasks performed by the vehicle onboard computer system 102 at the same time.

The prioritization module 116 is configured to set a priority for each audio stream received at the vehicle onboard computer system 102. The assigned priority for each audio stream creates an order in which each audio stream is processed further. In certain embodiments, the prioritization module 116 sets the priority of each audio stream according to a chronological order in which it was received by the audio detection module 110. In some embodiments, the prioritization module 116 determines a level of importance of a task command associated with each audio stream and sets the priority of each audio stream according to the determined level of importance.

To set the priority of an audio stream based on a chronological order, the prioritization module 116 performs a time-alignment of the audio streams to determine the chronological order in which each audio stream was received. Generally, the time-alignment is performed using a known time-alignment algorithm, which may include, without limitation: Round Robin, First-Come First-Served (FCFS), First-In First-Out (FIFO), time-slicing, or the like. Here, an internal clock of the onboard computer system 102 serves as a reference for time-alignment, and the prioritization module 116 determines a point in time marking the beginning of each audio stream. This beginning point for each audio stream is the comparison point, and is the point at which chronological order is determined. A first audio stream having a beginning point earlier in time than the beginning point of a second audio stream is determined to have the highest priority, and is processed first.

To set the priority of an audio stream based on a level of importance, specific tasks associated with each audio stream are identified, as described above with regard to the speech recognition module 114. The prioritization module 116 then performs a lookup at a precedence table stored in system memory 106, to determine the importance level of each identified task. The precedence table is a database containing predetermined priority information associated with each task that may be performed by the onboard computer system 102. The task associated with the greatest level of importance is determined to have the highest priority, and is performed first. The task associated with the next-greatest level of importance is determined to have the next-highest priority, and is performed second. This process of determining the level of importance for each task continues until all tasks have been assigned a priority, and then each task is processed accordingly.

Data stored in the precedence table may also be used in case of conflict, regardless of the normal scheme used in determining a priority for performance of tasks associated with the received audio streams. For example, when the prioritization module 116 prioritizes each audio stream according to a chronological order in which it was received, a conflict between audio streams received at the exact same moment in time may occur. In this case, the prioritization module 116 performs a lookup for each of the identified tasks associated with each respective audio stream. A priority level for each of the identified tasks is stored in the precedence table, and the prioritization module 116 retrieves and applies this information. The identified task having the highest priority is completed first, and the identified task having a lower priority is completed second.

When the prioritization module 116 sets the priority of each audio stream according to a determined level of importance, conflicts may also occur, and the precedence table may be used to resolve these conflicts. For example, the prioritization module 116 may determine, using the precedence table, that identified Task A and identified Task B have the same level of importance. In this case, the prioritization module 116 then identifies an associated location of the vehicle from which the audio streams for Task A and Task B originated. If the audio stream associated with Task A originated at the driver seat, and the audio stream associated with Task B originated as the front passenger seat, then the priority of each location (as listed in the precedence table) is used to determine the priority of processing the audio streams. Generally, the driver seat location in the vehicle is identified as the location having the highest priority, and as such, Task A will have a higher priority of processing than Task B.

In addition to the above described embodiments for determining a level of importance, other options may be present: any task may be designated as having the highest priority, to "trump" all other tasks in terms of priority of processing. Such tasks may include emergency tasks, such as initiating a hands-free telephone call or utilizing a vehicle telematics module; driver-specific tasks, such as requesting a navigation route; or the like. In some embodiments, this designation occurs at design time, and is stored in a precedence table within system memory 106. In addition, in certain embodiments, designated high priority tasks may be selected or de-selected by a user, using the user interface 108, so that the user may personally configure his/her voice-response system to suit his/her needs.

Figure 2:
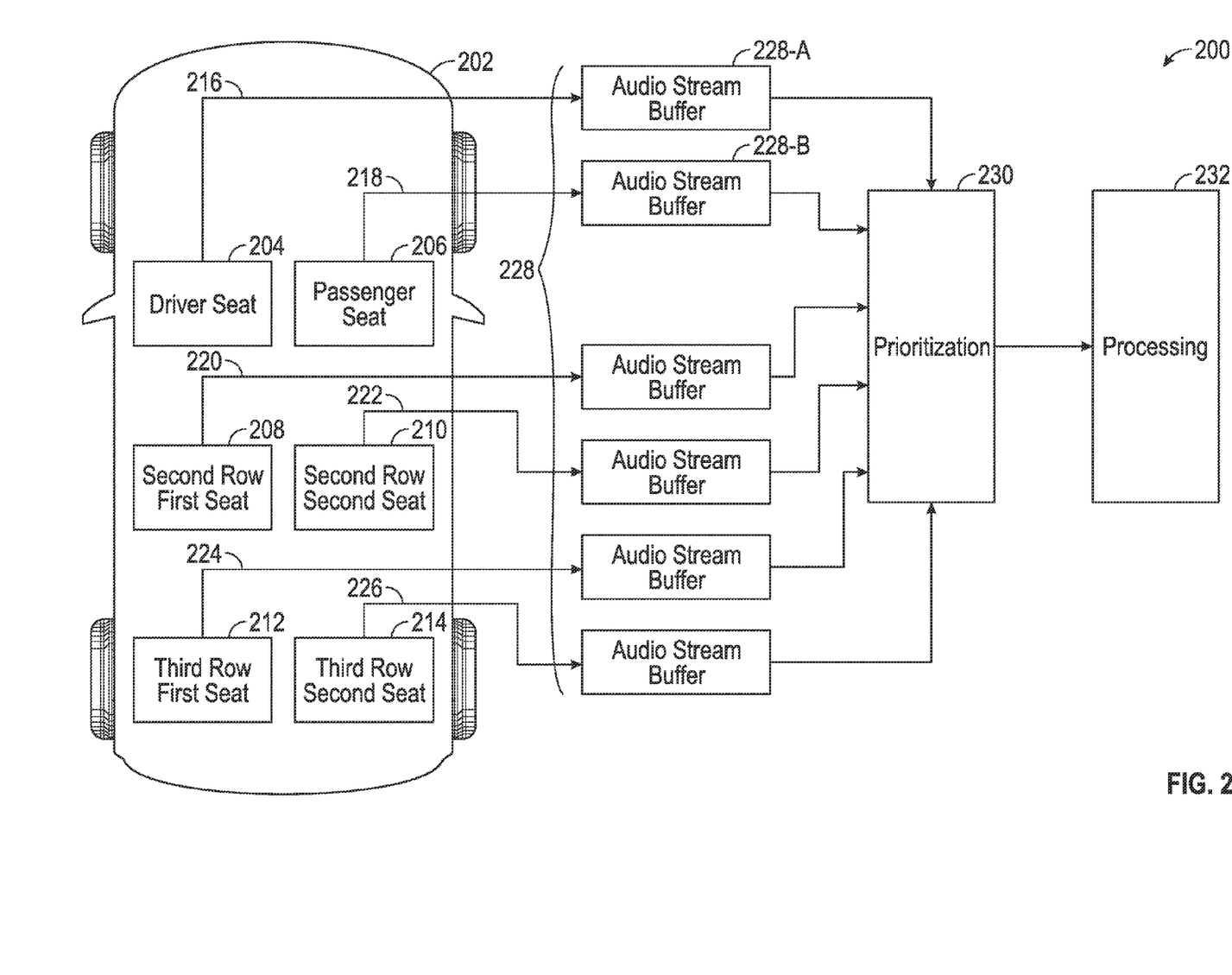
FIG. 2 is a diagram illustrating a system for receiving audio data for processing from defined locations in a vehicle, according to some embodiments.

FIG. 2 is a diagram illustrating an embodiment of a system 200 for receiving audio data for processing from defined locations in a vehicle 202. It should be noted that the system 200 can be implemented with the onboard computer system 102 depicted in FIG. 1. In this regard, the system 200 shows certain elements and components of the onboard computer system 102 in more detail. As shown, the defined locations of the vehicle 202 include a driver seat 204, a passenger seat 206, a second row first seat 208, a second row second seat 210, a third row first seat 212, and a third row second seat 214. In this embodiment, each seat of the vehicle 202 transmits a seat-specific audio stream to an audio stream buffer 228. For example, driver seat audio stream 216 is transmitted to audio stream buffer 228-A, while passenger seat audio stream 218 is transmitted to audio stream buffer 228-B. Audio stream buffer 228-A is configured to receive audio data only from the driver seat 204, and audio stream buffer 228-B is configured to receive audio data only from the passenger seat 206. Commonly used techniques to achieve this limited audio transmission include, without limitation, beamforming and/or audio preprocessing techniques.

In the illustrated embodiment, each audio stream is transmitted to an individual audio stream buffer 228, and each audio stream buffer 228 receives an audio stream from one defined location in the vehicle 202. Each audio stream buffer is configured to accumulate frames of audio data, and to digitize the audio data via sampling or another analog-to-digital conversion scheme. From each audio stream buffer 228, each received audio stream is then transmitted for prioritization 230. The process of prioritization 230 is described above with regard to the prioritization module (shown as reference 114 in FIG. 1), and will not be redundantly described here. After prioritization 230, further processing 232 occurs for each audio stream, in the order determined during prioritization 230.

Figure 3:
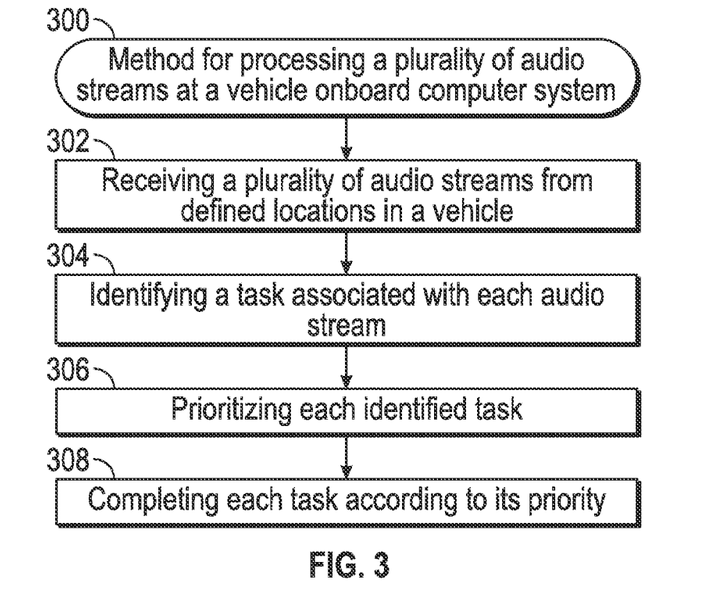
FIG. 3 is a flow chart illustrating a method for processing a plurality of audio streams at a vehicle onboard computer system, according to some embodiments.

FIG. 3 is a flow chart illustrating an embodiment of a process 300 of processing a plurality of audio streams at a vehicle onboard computer system. The various tasks performed in connection with process 300 described here may be performed by software, hardware, firmware, or any combination thereof. For illustrative purposes, the description of process 300 may refer to elements mentioned above in connection with FIGS. 1-2. In practice, portions of a described process may be performed by different elements of the described system, e.g., the system firmware, logic within a vehicle onboard computer system, or other logic in the system. It should be appreciated that a described process may include any number of additional or alternative tasks, the tasks shown in the figures need not be performed in the illustrated order, and that a described process may be incorporated into a more comprehensive procedure or process having additional functionality not described in detail herein. Moreover, one or more of the tasks shown in the figures could be omitted from embodiments of a described process as long as the intended overall functionality remains intact.

For ease of description and clarity, this example assumes that the process 300 begins by receiving a plurality of audio streams from defined locations in a vehicle (step 302). Each of the plurality of audio streams is received from a user seated in a defined location of the vehicle, as the user articulates (i.e., speaks aloud) a command for performance of a task by a vehicle onboard computer system.

In certain embodiments, the defined locations in the vehicle may include individual seats in the vehicle, as shown in FIG. 2. In some embodiments, the defined locations in the vehicle may include specific rows of vehicle seats in the vehicle. In other embodiments, the defined locations may include a designation of "front" or "back" of the vehicle, wherein the front of the vehicle refers to the row including the driver seat, and wherein the back of the vehicle refers to any location in the vehicle other than the row including the driver seat. Certain exemplary embodiments may include combinations of any and/or all of the previously described schemes for defining locations in the vehicle.

Once the plurality of audio streams have been received (step 302), the process 300 identifies a task associated with each audio stream (step 304). An identified task corresponds to a function of the vehicle onboard computer system, and generally, the user has spoken a command aloud for the purpose of instructing the onboard computer system to carry out the task. As described previously, tasks may include any function of which the onboard computer system is capable, including, without limitation: hands-free calling and associated tasks, entertainment functions (such as playing CDs or DVDs), controlling an onboard radio, media/entertainment functionality, internet access, vehicle telematics system capabilities (e.g., OnStar® functionality), and the like.

In certain embodiments, a single task is identified based on the articulated speech of the user. In other embodiments, plurality of possible tasks may be identified based on the articulated speech. This step of identifying more than one potential task is described in further detail in FIG. 4.

After identifying a task associated with each audio stream (step 304), the process 300 prioritizes each identified task (step 306) to determine a sequence for processing all of the identified tasks. For example, when Audio Stream A and Audio Stream B are received, the vehicle onboard computer system identifies Task A (identified through analysis of Audio Stream A) and Task B (identified through analysis of Audio Stream B). Task A and Task B are then placed in a determined order for processing, or in other words, each task is assigned a processing priority.

Priority for a task may be assigned according to the same chronological order in which its associated audio stream was received, or according to a predefined importance level of the task itself. In certain embodiments, the level of importance of each task may correspond to a point on a scale of varying degrees of importance, wherein the scale begins at a point of least importance and ends at a point of greatest importance. In some embodiments, the level of importance may include a simple designation as a high priority task or a low priority task. In some embodiments, a combination of the previously described priority assignments may be implemented. In still other embodiments, certain tasks may be designated as having "highest" priority, indicating that the task will be processed before any other task. Generally, tasks designated as "highest" priority include emergency tasks, driver-specific tasks, and the like.

After each task has been prioritized (step 306), the process 300 initiates completion of each task according to its assigned priority (step 308). Although the plurality of audio streams is received at a vehicle onboard computer system, the process 300 may initiate further processing either at the onboard computer system or at a remote server. More specifically, the steps of identifying a task associated with each audio stream (step 304) and prioritizing each identified task (step 306) may be performed at a remote server, and the results communicated back to the vehicle onboard computer system for completion of the identified tasks.

Figure 4:
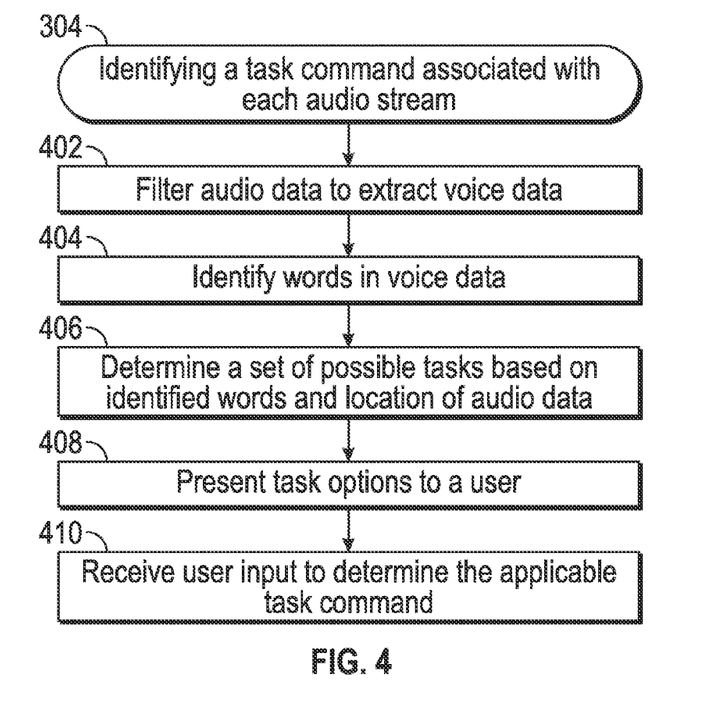
FIG. 4 is a flow chart illustrating a method of identifying a task command associated with each audio stream, according to some embodiments.

FIG. 4 is a flow chart illustrating an embodiment of a process 400 of identifying a task command associated with each audio stream (shown as reference 304 in FIG. 3). The process 400 begins by filtering received audio data to extract voice data (step 402). Generally, any received audio data is in the form of individual audio streams, and each audio stream is transmitted from a defined location in the vehicle. (This concept is illustrated and described with reference to FIG. 2, and will not be redundantly described here.) Audio streams include voice data and possibly extraneous background noise; extraneous background noise is filtered using well-known techniques, to include beamforming techniques and audio preprocessing techniques.

Next, the process 400 identifies the words present in the voice data (step 404). The process 400 initiates an automated speech recognition (ASR) algorithm to identify the speech articulated by the user in the location of the microphone or other voice detection device used to receive audio data. The process 400 may initiate multiple threads to perform speech recognition for each received audio stream and to store the results.

Once the words present in the voice data have been identified (step 404), the process 400 determines a set of possible, hypothetical tasks based on the identified words (e.g., the results stored in step 404) and location of the audio data (step 406). Each location in a vehicle is associated with a set of tasks which may be initiated by an occupant of that location, to be completed by the vehicle onboard computer system. For example, a task that is likely to be associated with a front-row or driver seat location may include requesting a navigation route from the onboard computer system. Likely tasks associated with a backseat passenger may include streaming Bluetooth audio or selecting a DVD chapter for viewing. The set of possible tasks based on the location of the audio data is based on the limited set of tasks having functionality in the location in question.

Further, the set of possible tasks is affected by the identified words in the voice data, and the statistically likely options when these words are contrasted with potential commands associated with the onboard computer system. For example, if a user requests that the onboard computer system play streaming audio by artist John Doe, the system may identify tasks associated with playing streaming audio by artist John Doe, playing streaming audio by artist Jack Doe, and playing streaming audio by artist John Toe. Each hypothesis, or option, is associated with a statistical likelihood that it is the correct option, based on the identified words in the voice data. The statistical likelihood of each option determines which options are presented to the user. Using the previous example, the statistical likelihood that the identified words indicate playing streaming audio by artist Jack Doe will be much lower than the statistical likelihood that the identified words indicate playing streaming audio by artist John Doe. When the statistical likelihood is below a predetermined threshold, the option is not presented to the user.

After determining the set of possible tasks based on the identified words and location of the audio data (step 406), the process 400 presents the set of possible tasks to a user (step 408) as selectable command options. In certain embodiments, a visual representation of the selectable command options is presented via a user interface (reference 108 in FIG. 1). In some embodiments, the selectable command options are presented using audible voice technology, such as speech synthesis or text to speech technology. Options for presentation of selectable command options may be configured by a user.

In the case where multiple audio streams are processed simultaneously, each audio stream will have its own set of possible tasks based on the location from which the audio stream originated, and based on the words articulated by the passenger in that location. In certain embodiments, each set of command options is presented to each corresponding passenger in chronological order according to which audio stream was received first. In other embodiments, each set of command options is presented to each corresponding passenger according to a level of importance associated with the tasks requested by the passengers.

For example, Passenger A may be sitting in the driver seat and Passenger B may be sitting in the back seat of the same vehicle. Passenger A begins to articulate a voice command for the vehicle onboard computer system to produce a navigation route to assist him in driving. While Passenger A is still speaking, Passenger B begins to articulate a voice command to play a particular radio station. In this example, the audio stream originating at the driver seat (Passenger A's request for a navigation route) would likely produce a set of possible tasks to be presented to Passenger A for selection before any options would be presented to Passenger B. Passenger A articulated his request before Passenger B, and if the process 400 is prioritizing requests based on chronological order, then Passenger A will be presented with selectable options first. If the process 400 is prioritizing requests based a level of importance, two factors would be applicable in this case: first, a request for a navigation route may have a higher priority than entertainment functionality, such as playing a radio station; and second, Passenger A is in the driver seat while Passenger B is in the backseat, and driver-specific tasks may have a higher priority than tasks associated with other locations in the vehicle.

Next, the process 400 receives user input to determine the applicable task command (step 410). The user may provide input by pressing a button, activating a selection via touchscreen, turning a knob, or other physical action recognizable by a vehicle onboard computer system indicating a selection. In certain embodiments, the user may verbally confirm a selection, and the process 400 will repeat the process of receiving the audio stream, identifying the words in the audio stream, and proceeding accordingly.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for processing a plurality of audio streams at a computer system onboard a vehicle, the method comprising:
   receiving the plurality of audio streams from a plurality of locations within a vehicle;
   identifying a plurality of tasks associated with the plurality of audio streams, wherein each of the plurality of tasks is associated with a respective one of the plurality of audio streams, and wherein each of the plurality of tasks corresponds to a function of the computer system onboard the vehicle;
   prioritizing each of the plurality of tasks to obtain a prioritized sequence for processing the plurality of tasks; and
   completing each of the plurality of tasks according to the prioritized sequence.

2. The method of claim 1, further comprising:
   determining a chronological order of each of the plurality of audio streams;
   wherein the prioritizing step is performed according to the chronological order of each of the plurality of audio streams.

3. The method of claim 2, further comprising:
   performing a time-alignment for each of the plurality of audio streams to obtain a result;
   wherein the step of determining the chronological order is performed using the result of the time-alignment.

4. The method of claim 1, wherein the prioritizing step is performed according to a level of importance of each of the plurality of tasks.

5. The method of claim 4, wherein the identifying step is performed using an automated speech recognition algorithm.

6. The method of claim 1, wherein:
   the receiving step comprises receiving each of the audio streams using a plurality of microphones, each of the plurality of microphones associated with a respective one of the plurality of locations within the vehicle, and the plurality of locations comprising at least a first row and a second row;
   the first row is associated with a first subset of the plurality of microphones tuned to a predetermined set of first row passengers; and
   the second row is associated with a second subset of the plurality of microphones tuned to a predetermined set of second row passengers.

7. The method of claim 1, further comprising:
   identifying a task associated with one of the plurality of audio streams, wherein the one of the plurality of audio streams is associated with one of the plurality of locations, and wherein the plurality of tasks comprises the task;
   generating a list of command options for the task; and
   presenting the list of command options to a passenger at the one of the plurality of locations.

8. The method of claim 7, wherein the list of command options comprises a plurality of pre-defined task commands associated with the one of the plurality of locations.

9. The method of claim 7, further comprising:
   determining a level of importance of the task associated with one of the plurality of audio streams;
   wherein the presenting step is performed according to the level of importance of the task.

10. An audio processing system for processing a plurality of audio streams simultaneously received at a vehicle onboard computer system, the audio processing system comprising:
    an audio detection module, configured to receive and differentiate between a plurality of audio streams in a vehicle, each of the plurality of audio streams comprising a task to be performed by the vehicle onboard computer system;

a speech recognition module, configured to recognize speech included in each of the plurality of audio streams, and to identify the task associated with each of the plurality of audio streams based on the recognized speech, wherein the task associated with each of the plurality of audio streams corresponds to a function of the vehicle onboard computer system;

a prioritization module, configured to determine a processing sequence for a plurality of tasks associated with received audio streams; and a processing module, configured to process and perform the plurality of tasks according to the processing sequence.

11. The audio processing system of claim 10, further comprising:

a time-alignment module, configured to perform a time-alignment for each of the plurality of received audio streams to determine a chronological sequence of each of the plurality of received audio streams;

wherein the prioritization module determines the processing order according to the chronological sequence of each of the plurality of audio streams.

12. The audio processing system of claim 10, wherein the prioritization module is further configured to determine a level of importance for the task, and to determine the processing sequence according to the level of importance.

13. The audio processing system of claim 10, wherein the audio detection module is further configured to receive and differentiate between a subset of the plurality of audio streams that are within a defined range of frequencies, wherein the defined range of frequencies is associated with a particular location in the vehicle; and wherein the prioritization module is further configured to determine the processing sequence for processing and performance of a second subset of the plurality of tasks based on the particular location, wherein the second subset of the plurality of tasks is associated with the subset of the plurality of audio streams.

14. The audio processing system of claim 10, further comprising:

a communication module, configured to transmit audio data associated with the plurality of audio streams to a remote server;

wherein the steps of differentiation of the plurality of audio streams and determining the processing sequence are performed at the remote server.

15. A non-transitory, computer-readable storage medium comprising instructions stored thereon, wherein the instructions, when executed by a processor, perform a method comprising:

in response to received audio data at a vehicle onboard computer system, extracting a plurality of audio streams from the received audio data;

identifying a plurality of tasks associated with the plurality of audio streams, wherein each of the plurality of tasks is associated with a respective one of the plurality of audio streams, and wherein each of the plurality of tasks corresponds to a function of the vehicle onboard computer system; and determining a precedence for processing each of the plurality of tasks by the vehicle onboard computer system.

16. The non-transitory, computer-readable storage medium of claim 15, wherein the method performed by the instructions further comprises:

determining a level of importance of each of the plurality of audio streams, wherein the precedence for processing each of the plurality of audio streams is determined according to the level of importance.

17. The non-transitory, computer-readable storage medium of claim 15, wherein the method performed by the instructions further comprises:

determining a location associated with each of the plurality of audio streams, wherein the precedence for processing each of the plurality of audio streams is determined according to the location.

18. The non-transitory, computer-readable storage medium of claim 15, wherein the method performed by the instructions further comprises:

determining a chronological order associated with each of the plurality of audio streams, wherein the precedence for processing each of the plurality of audio streams is determined according to the chronological order.

19. The non-transitory, computer-readable storage medium of claim 15, wherein the method performed by the instructions further comprises:

identifying a task associated with one of the plurality of audio streams, wherein the one of the plurality of audio streams is associated with one of a plurality of locations in a vehicle, and wherein the plurality of tasks comprises the task;

generating a list of command options for the task; and presenting the list of command options to a passenger at the one of the plurality of locations in the vehicle.

* * * * *